United States Patent [19]
Springfeld

[11] 3,784,339
[45] Jan. 8, 1974

[54] DISK EXTRUDER
[75] Inventor: Artur Springfeld, Munich, Germany
[73] Assignee: Kunststoffwerk Gebruder Anger GmbH, Munich, Germany
[22] Filed: Dec. 21, 1971
[21] Appl. No.: 210,354

[52] U.S. Cl.............................. 425/133, 425/381.2
[51] Int. Cl................................................ B29f 3/00
[58] Field of Search.................. 425/131, 133, 200, 425/207, 208, 209, 381.2

[56] References Cited
UNITED STATES PATENTS

| | | | |
|---|---|---|---|
| 3,490,097 | 1/1970 | Gould | 425/131 X |
| 3,355,764 | 12/1967 | Moyer | 425/251 |
| 3,520,966 | 7/1970 | Soffiantini | 425/133 X |
| 3,122,788 | 3/1964 | Lieberman | 425/381.2 X |
| 3,303,253 | 2/1967 | Henry | 425/381.2 X |

*Primary Examiner*—H. A. Kilby, Jr.
*Attorney*—Edmund M. Jaskiewicz

[57] ABSTRACT

A disk extruder comprises a pair of spaced stators each having a spiral channel on its inner face and a disk-shaped rotor is rotatably mounted between the spiral channels and closely positioned to the channels so that rotation of the rotor moves a plastic molding material along the spiral channel. One stator has a central opening defining a nozzle and a cylindrical core on the other stator extends into the nozzle to define an annular gap. Hollow cylindrical sections can be attached to the outer face of the stator to extend the annular gap and a temperature controlling medium may be circulated through the sections. A cylindrical extension on the rotor is positioned within the gap and separates the plastic material flowing from each stator until this molding material reaches the cooling sections whereby a multi-ply tubular member is formed.

8 Claims, 3 Drawing Figures

DISK EXTRUDER

The present invention relates to an extruding apparatus, more particularly, to a disk extruder for the manufacture of seamless single or multiply tubular members from a synthetic plastic material.

Various forms of apparatus have been devised for the extrusion of hollow tubular members, such as pipes. In one form of an extruder, the extruder head is provided with a core or mandrel which is held rigidly in the flow of molding material which is being forced through a nozzle. The mandrel is held in position by means of a number of cross pieces and diverts the plastic molding material to flow around the mandrel in order to form a hollow section. The extruder head is also been provided with a core unilaterally supported in a housing so as to be suspended in the flow of plastic molding material. The core is thus surrounded by a lateral flow of this material and the material flows around the core and comes together again at the rear face of the core to form a hollow section.

In both of these extruder heads, the plastic molding material is divided and then flows together to fuse at one or more points to form the tubular member. In effect, several streams of molding material are fused together along seams which produce defects in the wall of the tubular element during a continuous extruding operation. The defects are caused by the boundary surface phenomenae in a turbulent region of the cross pieces or radial supporting brackets upon which the core is mounted. Deposits of the plastic material accumulate at these cross pieces and are periodically detached to become embedded in the fused seams formed upon the reuniting of the several streams of plastic material. In addition, the cooling or heating of the articles of plastic material because of contact or friction with the cross pieces may prevent an optimum fusion of the streams. The cross pieces supporting the core also have the property of orienting the flow of molding material along the longitudinal axis of the tubular member which results in an increase in the strength of the tubular member in the longitudinal direction. However, a strengthening in a longitudinal direction of tubular members within which a fluid under pressure will flow is not particularly advantageous since the greatest stresses in such a pressure pipe occur circumferentially when the pipe is subjected to a load under normal operating conditions.

In an effort to eliminate the advantages of extruding hollow members as described above, it has been proposed to obtain a circumferential orientation of the wall of a tubular member by means of a rotating nozzle ring or core. However, based upon extensive tests and experiments such devices have been shown not to be practical or feasible.

A further disadvantage of known extrusion heads for forming tubular members is that such heads do not provide any possibility for cooling and accurately forming to predetermined dimensional relationships the inner faces of extruded tubular members. The amounts of coolant or temperature controlling medium required for such a purpose cannot be circulated through the cross pieces of the extruder heads without undercooling the cross pieces. The cross pieces are thus cooled to a temperature below that necessary for maintaining a continuous smooth flow of the plastic molding material through the extruder head. Upon under cooling of the cross pieces the quality of the fused seams is again adversely affected which is not particularly desirable in fabricating tubular members which will be subjected to internal pressure during their normal operation or to hollow elements which are to be subsequently used in blow molding operations.

It has been found that when tubular members are formed with their inner surfaces being precisely calibrated and cooled, the stresses in the wall of the tubular member are distributed more uniformly when the tubular member is cooled from the inside than in the case where the tubular member is cooled only from the outside after the extrusion. Also, cooling from the inside results in greater strength in the tubular members. In addition, more accurate pipe walls having closer tolerances may be attained through simultaneous calibration of both the inner and outer surfaces of the tubular member.

It is therefore the principal object of the present invention to provide a novel and improved apparatus for extruding seamless tubular members from a synthetic plastic material.

It is another object of the present invention to provide an apparatus for the extruding of tubular members wherein the inner and outer surfaces are cooled at the same rate to precisely form the cooled areas.

It is an additional object of the present invention to provide an apparatus for the extruding of tubular members wherein the thickness of the walls of the tubular members may be selectively varied and the walls may be single or multi-ply.

The objects of the present invention are achieved by the disclosed apparatus which essentially comprises a disk-shaped rotor rotatably mounted between two stators whose inner faces are provided with spiral channels. The molding material is supplied from outside the stators through openings at the outer ends of the spiral channels and is conveyed toward the center of the channels by means of the rotation of the rotor. One of the stators is provided with a central opening and the other stator is provided with a core or mandrel which extends into the nozzle opening so as to define an annular gap. The molding material enters the annular gap while in a plastic state and is circumferentially oriented and accumulated continuously to form a wall of a tubular member. By means of the pressure which is generated through the feeding of the molding material into the outer ends of the spiral channels the molding material is extruded outwardly through the annular gap to form continuously a hollow tubular section, pipe, hose, sheet, and the like.

A plurality of cylindrical or semi-cylindrical sections can be successively attached to the stator so as to extend the annular gap. A coolant or temperature controlling medium may be circulated through these attachments so as to cool the extruded tubular member on both its inner and outer surfaces at predetermined and readily controlled rates.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views a specific embodiment and modifications of the present invention will be described in detail.

Figure 1:
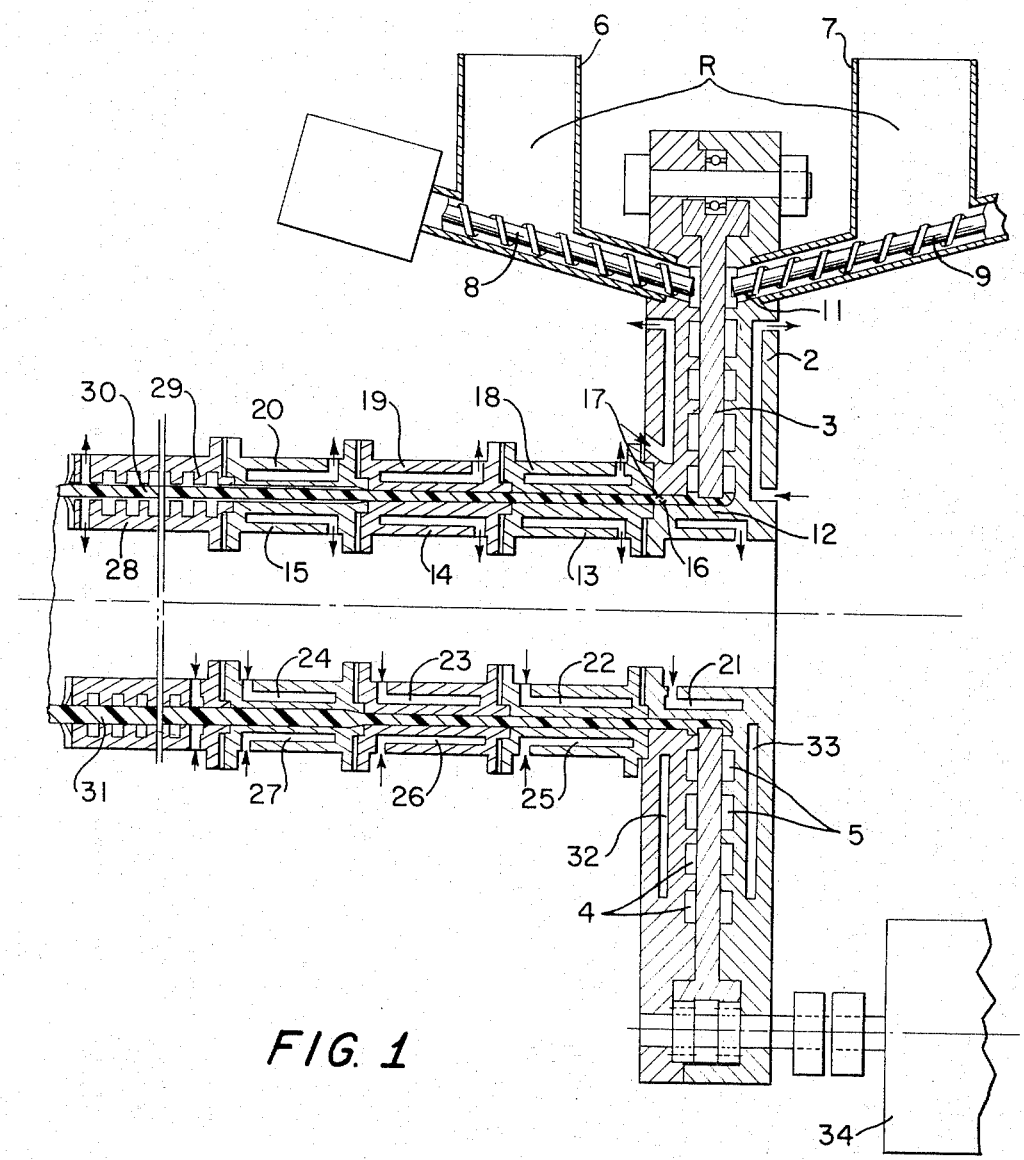
FIG. 1 is a longitudinal sectional view through the extruding apparatus of the present invention.

It may be seen in FIG. 1, the apparatus according to the present invention is essentially a disk extruder which comprises stators 1 and 2 between which is rotatably mounted a disk-shaped rotor 3 having flat surfaces. The inner faces of the stators 1 and 2 adjacent the rotor 3 are provided with sprial channels 4 and 5. These sprial channels considerably increase the surface area of the stators 1 and 2 and they are therefore in greater contact with the conveyed molding material. On the one hand, the molding material must be heated by this surface of the stators and, on the other hand, heat generated during the plasticizing of the molding material must be dissipated and in certain cases removed.

The greater the surface area whose temperature can be controlled and which is in contact with the molding material, the more effective and successful will be the operations of heating the molding material and dissipating generated heat. Since it is not feasible to supply the rotor 3 with a heating or cooling medium, the sprial channels 4 and 5 in the stators 1 and 2 is advantageous both with respect to control of thermal phenomena occurring during the extrusion and with respect to the quality of the extruded product.

Hollow chambers 32 and 33 are provided in the stators 1 and 2 for the circulation therethrough of suitable heating or cooling medium for the purposes of temperature control. The rotor 3 may be driven by a driving motor 34 that is provided with an infinitely variable speed control transmission through gearing which may comprise a ring gear on the periphery of the rotor 3.

A suitable molding material which may be a synthetic plastic is indicated at R and is retained in supply containers 6 and 7 from which the molding material is fed into the outer ends of the spiral channels 4 and 5 through openings 10 and 11 in stators 1 and 2 by means of helical screws 8 and 9. The rate at which the molding material is fed into the spiral channels 4 and 5 is constant in all angular positions of the rotor 3. It is known in the art that the rate of filling a stationary input channel is greater than that of a channel whose angle of inclination is constantly varying. The feed arrangement as disclosed herein thus provides a much higher rate of conveying molding material together with a pulse-free discharge of the molding material.

The molding material R thus fed into the spiral channels 4 and 5 is guided by the rotation of rotor 3 toward the outlets of the spiral channels which are located adjacent the periphery of a cylindrical core 12 mounted on the stator 2 and located at the center of the extruder. The molding material is thus subjected to a certain circumferential orientation because it is applied with a circular movement to the outer periphery of the core 12 and is also rotated because of the rotation of rotor 3. During the progress of the molding material through the spiral channels 4 and 5 to the core 12, the molding material is plasticized and homogenized in a manner known in the art. The core 12 may actually constitute a portion of the stator 2 as illustrated in FIG. 1 and it may be extended to any desired length by attaching one or more flanged cylindrical members 13, 14 and 15. The peripheral surface 16 of the core 12 is centrally located within a centrally disposed nozzle opening 17 formed in the stator 1 so as to define an annular gap through which the molding material is extruded.

The annular gap or die aperture 16, 17 (defined by the nozzle 17 and cylindrical surface 16) may also be extended by attaching one or more flanged cylindrical elements 18, 19 and 20 which are positioned concentrically with respect to the attachments 13–15. With this construction it is apparent that the core 12 is positioned centrally within the material being extruded from the spiral channels and the material is thus extruded into a tubular shape without being sub-divided by any cross pieces or suspension members for the core 12. Since there are no cross pieces the molding material is extruded into a tubular member without any seams or any necessity for fusing of streams of molding material.

The attachments 13–15 and 18–20 may be provided with shapes other than cylindrical so that the extruded tubular member can have a cross section other than the circular cross section with which it emerges from the extrusion orifice 16, 17.

For purposes of temperature control the core 12 may be provided with hollow chambers 21 through which a suitable temperature controlling medium or coolant can be circulated. Similarly, the extension elements 13–20 are provided with hollow chambers 21–27 through which large quantities of temperature controlling media may be circulated as may be required. The core 12 and cylindrical attachments 13 and 18 may have a temperature controlled by a heating medium while the next adjacent attachments 14 and 19 may be controlled as desired with a heating or cooling medium, depending on whether tubular members are to be produced having normal or increased wall thickness. Cylindrical attachment elements 15 and 20 are preferably controlled exclusively with a cooling medium.

Attached to the attachments 15 and 20 may be additional attachments 28 and 29 having cooling passages in their outer and inner faces respectively so as to circulate a suitable temperature controlling medium directly against the inner and outer surfaces respectively of the extruded tubular member. As a result of this combination of heating and cooling sections with annular gaps of varying widths it is possible to produce tubular members having an increased wall thickness in certain portions thereof by selecting a heating or cooling medium to be circulated through a particular cylindrical attachment.

As can be seen in FIG. 1, the annular gap between the attachments 15, 20 and 28, 29 is greater than the gap between attachments 14,19; 13,18; and 16,17. This means that a tubular member having a wall thickness greater than that of the annular gap 16, 17 can be formed with this invention. In FIG. 1, the upper portion of the tubular member indicated at 30 is illustrated with a normal wall thickness. Such a thickness is formed if the attachment elements 14, 19 are cooled so that the extruded tubular member is calibrated both on its inner and outer surfaces in these sections.

In the lower portion of FIG. 1, there is shown at 31 a tubular member having a predetermined greater wall thickness. This thicker wall is formed if the attachments 14, 19 have a heating medium circulated therethrough and only sections 15, 20 have a cooling medium circulated therethrough. Under these conditions, the molding material is in the plastic state as it passes from the sections 14, 19 and accumulates or swells through a braking effect to a greater wall thickness in sections 15, 20 which define annular gap. The braking effect is produced by subsequent devices or, possibly, by a special braking unit that is not illustrated by the drawings. The molding material is calibrated on the cool surfaces of attachments 15, 20 which may also be extended by a further identical section or a plurality of such sections, if necessary, and the material passes from this section with a greater wall thickness. In a subsequent external and internal cooling bath applied by sections 28, 29, the tubular member is directly surrounded by a flow of cooling medium and is cooled to room temperature. By circulating heating or cooling media at suitable intervals through the sections 14, 19 one can attain a predetermined wall thickness over predetermined lengths of the extruded tubular member as may be desired.

While the present invention has been described and illustrated as having a flat disk-shaped rotor it is pointed out that the extruder may be modified so that the stators 1 and 2 as well as the rotor 3 may also be conical or tapered. It is only necessary that the inner surfaces of the stators conform to the surfaces of the rotor so that the spiral channels on the inner faces of the stators will be closely adjacent the rotor in the manner as illustrated in the drawings.

Figure 2:
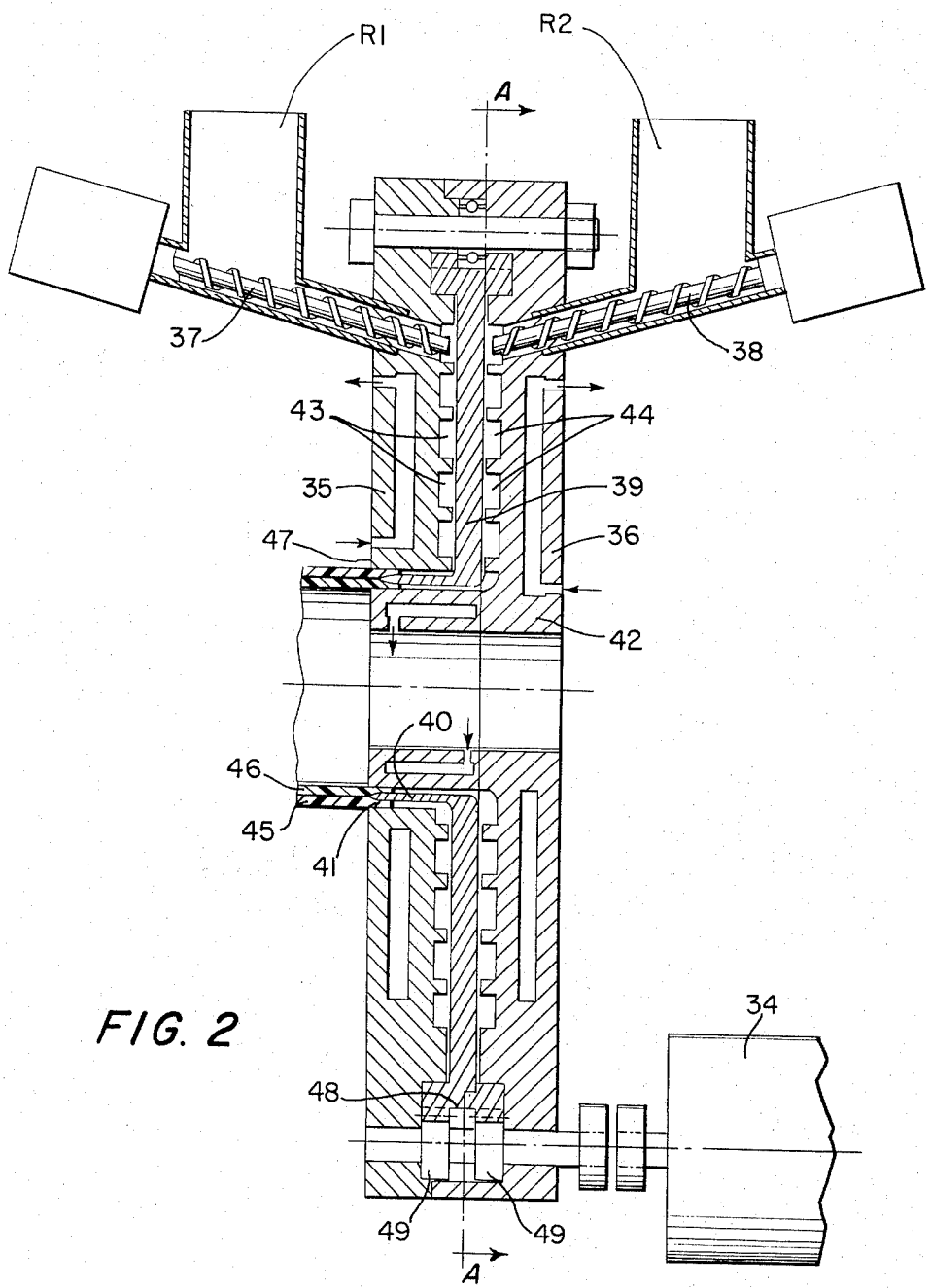
FIG. 2 is a view similar to that of FIG. 1 but showing a modification thereof and with the cooling attachment being cut away.

In FIG. 2, there is illustrated a modification of the present invention which is particularly adaptable for the production of two-ply tubular members or sheets. In order to produce such a multi-ply member stators 35 and 36 are supplied with two different molding materials $R_1$ and $R_2$ by means of helical screws 37 and 38. A rotor 39 is provided at its inner circumference with a cylindrical or annular extension 40 which is disposed at right angles to the rotor. The cylindrical extension 40 projects into an annular gap 41 defined by a nozzle 47 in the stator 35, and a core 42 on the stator 36. Thus, the cylindrical extension 40 is positioned concentrically with respect to the nozzle 47 and core 42. The cylindrical extension 40 prevents the mixing of the two streams of molding material emerging from the inner ends from the spiral channels 43 and 44 of stators 35 and 36 and maintains these molding materials separate from each other until these materials flow past the outer pointed end of the extension 40. At this point the two materials come together to form a two-ply tubular member having plys 45 and 46.

The extruded multi-ply pipe may be flattened to form a multi-ply sheet. In a similar manner, a single-ply tubular member may either be subsequently split to form an extruded sheet or may be flattened to form a two-ply strip. The remaining structure of the modification of FIG. 2 is similar to that of the corresponding structure of FIG. 1 and need not be described in detail.

Figure 3:
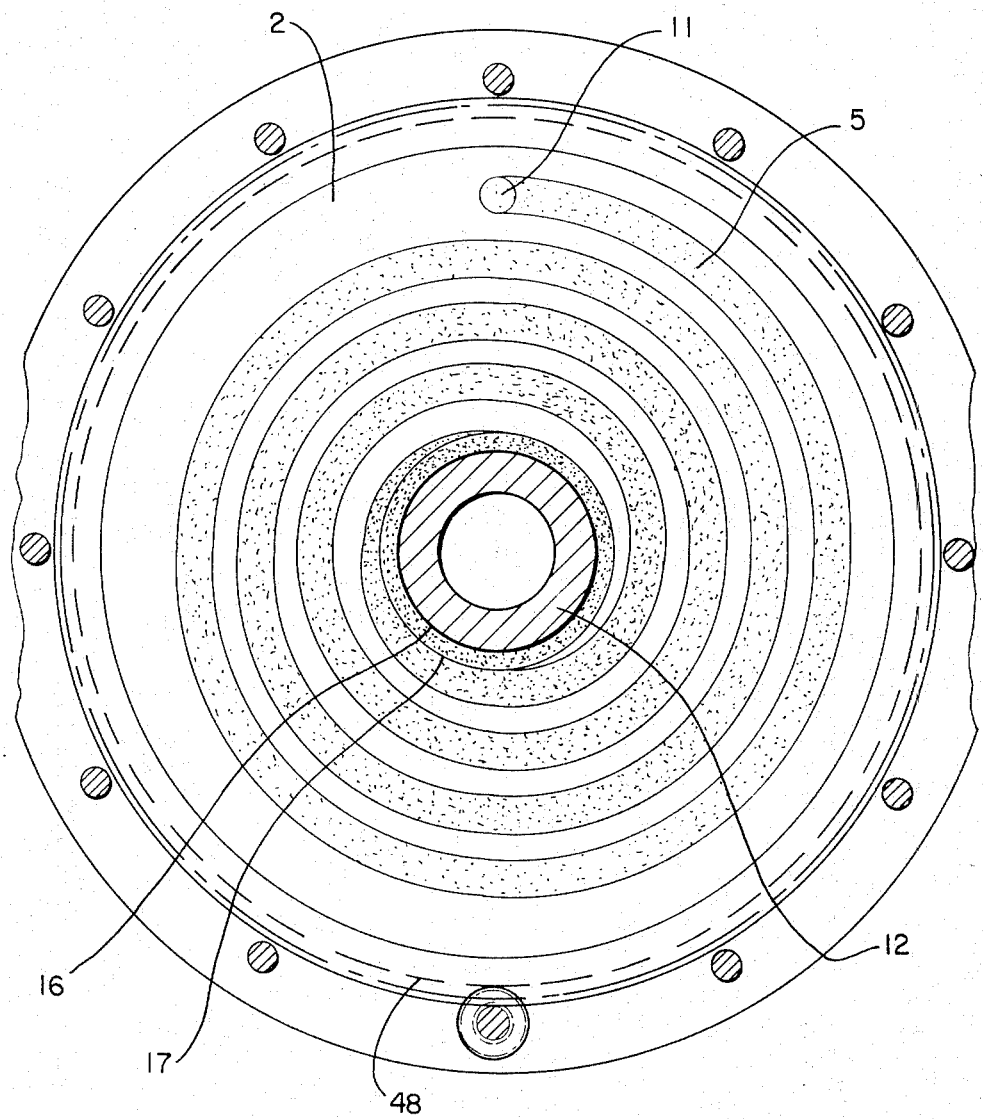
FIG. 3 is a sectional view taken along the line A—A of FIG. 2.

In FIG. 3 there is illustrated an elevational veiw of the inner face of the stator 2 or 36. The configuration of the spiral channel 5 or 34 into which the molding material is fed through opening 11 in stator 2 is thus clearly seen. The channel 5 extends to the outer periphery of the core 12. As described above, as the molding material is conveyed through the spiral channel under the action of the rotation of the rotor 3 the molding material is heated, plasticized and homogenized and finally forced outwardly under pressure through the nozzle gap 16, 17 to be extruded into a tubular member. The two stators 1,2 and 35,36 are securely attached to each other at their outer peripheries by means of a plurality of bolts. The rotor 3 is supported on its circumference by means of a ring of frictionless balls or rollers 49 and is driven by means of a ring gear 48 by motor 34.

It is therefore apparent that the extruder according to the present invention possesses numerous advantages over previously known extruders since with the present extruded tubular members can be continuously produced from plastic material without any seams or fused portions in the walls of the tubular members and the material in the walls of the tubular members is oriented circumferentially. A further advantage resides in the elimination of a drawing-off device which is required in known extruders. In the present extruder the drawing-off device can be eliminated because the extruder permits the simultaneous inside and outside calibration of tubular members with the same intensity or rate of cooling and, in addition, permits the simultaneous cooling of the inner and outer surfaces. These operations are performed simultaneously and, accordingly, the wall thickness of the extruded tubular member is determined by the calibration gap and not by the rate of drawing-off of the extruded material. However, such a drawing-off device may be advantageously used with the present invention for increasing the thickness of the walls of tubular members along certain selected distances and at predetermined intervals between these thickened walls. This can be accomplished by means of die and core extensions arranged in pairs with these extensions having jacks or chambers through which suitable heating or cooling media can be circulated.

The extruder according to the present invention can also be used for producing tubular members having a wall of at least two different molding materials such as foam on the outside and a homogeneous material on the inside or an impact resistant material on the outside and a hard material on the inside. Sheets can also be formed whose wall on the outside and the inside comprises two materials having properties particularly suitable for the eventual application of the material. Multilayer sections can thus be readily manufactured. It is pointed out that the subject matter of the present invention relates to the German Pat. Nos. 82,261, 909,821 and 1,032,523.

It will be understood that this invention is susceptible to modification in order to adapt it to different usages and conditions, and accordingly, it is desired to comprehend such modifications within this invention as may fall within the scope of the appended claims.

What is claimed is:

1. In an apparatus for extruding seamless tubular members from synthetic plastic material, the combination of a pair of spaced stationary stators having fixed spiral channels on their inwardly directed faces, a rotor rotatably mounted between said spiral channel faces, said stators having inlet openings in said spiral channels through which a plastic molding material is introduced, one of said stators having a central opening defining a nozzle, and a hollow cylindrical core on the other stator and extending non-rotatably into said nozzle to define an annular gap through which plastic material is extruded in a tubular shape.

2. In an apparatus as claimed in claim 1 and including means within said gap for forming multi-ply tubular members, said multi-ply forming means comprising a cylindrical extension on said rotor extending into the annular gap so that plastic material from one stator spiral channel flows along the outer face of said cylindrical extension and plastic material from the other stator spiral channels flows along the inner face of said cylindrical extension.

3. In an apparatus as claimed in claim 1 and comprising means attached to said nozzle for extending said annular gap, and means on said extension means for controlling the temperature thereof whereby the rate of cooling of an extruded tubular member moving through said extension means can be regulated.

4. In an apparatus as claimed in claim 3 wherein said extension means comprises concentric cylindrical elements defining jacket means through which a temperature controlling medium can be circulated.

5. In an apparatus as claimed in claim 4 wherein the ends of said cylindrical elements are flanged, and a plurality of said elements being connected at their flanges.

6. In an apparatus as claimed in claim 3 and comprising means on the outer end of said annular gap extension means for applying a temperature controlling medium directly to an extruded tubular member as it emerges from said annular gap extension.

7. In an apparatus as claimed in claim 6 wherein the portion of the annular gap extension immediately before the temperature controlling medium applying means has a width greater than the width of the annular gap.

8. In an apparatus as claimed in claim 3 wherein said gap extension means comprises a plurality of serially connected sections, and means on each of said sections for defining hollow chambers therein through which a temperature controlling medium can be circulated.

* * * * *